(12) United States Patent
Birenheide (10) Patent No.: US 11,104,263 B2
(45) Date of Patent: Aug. 31, 2021

(54) LOAD SECURING BAR

(71) Applicant: WISTRA GmbH Cargo Control, Selmsdorf (DE)

(72) Inventor: Christian Birenheide, Berkenthin (DE)

(73) Assignee: WISTRA GmbH Cargo Control, Selmsdorf (DE)

( * ) Notice: Subject to any disclaimer, the term of this patent is extended or adjusted under 35 U.S.C. 154(b) by 174 days.

(21) Appl. No.: 16/123,020

(22) Filed: Sep. 6, 2018

(65) Prior Publication Data

US 2019/0077296 A1     Mar. 14, 2019

(30) Foreign Application Priority Data

Sep. 8, 2017    (DE) .................... 20 2017 105 457.8

(51) Int. Cl.
    *B60P 7/08*     (2006.01)
    *B60P 7/15*     (2006.01)
    *B61D 3/16*     (2006.01)

(52) U.S. Cl.
    CPC . *B60P 7/15* (2013.01); *B61D 3/16* (2013.01)

(58) Field of Classification Search
    CPC .................................... B60P 7/15; B61D 3/16
    USPC ................................................. 410/144–150
    See application file for complete search history.

(56) References Cited

U.S. PATENT DOCUMENTS

| | | |
|---|---|---|
| 2,896,554 A | 7/1959 | Johnston |
| 3,130,690 A | 4/1964 | Johnston |
| 5,688,087 A * | 11/1997 | Stapleton ................ B60P 7/15 410/143 |
| 6,210,090 B1 * | 4/2001 | Wyse ...................... B60P 7/15 410/143 |
| 2013/0284685 A1 * | 10/2013 | Lines-Pinckney ..... A47H 1/022 |

FOREIGN PATENT DOCUMENTS

| | | |
|---|---|---|
| DE | 18 06 986 U | 2/1960 |
| DE | 10 2007 048 894 A1 | 10/2007 |
| EP | 1 207 075 A1 | 11/2000 |
| EP | 2 048 028 A1 | 8/2008 |
| EP | 2 907 696 A1 | 2/2014 |
| WO | WO 2004 060718 A2 | 7/2004 |

(Continued)

OTHER PUBLICATIONS

Brochure entitled "Mechanical load securing", Wistra Airline Beam 1855, info@wistra.eu, 6 pp., believed to have been sold before Sep. 8, 2017.

(Continued)

*Primary Examiner* — Stephen T Gordon
(74) *Attorney, Agent, or Firm* — Crowell & Moring LLP (57) ABSTRACT

The invention relates to a load securing bar for a load securing system with lashing points that have at least one tie bar (24), which has hook-shaped form fitting elements (9) on the ends of the load securing bar, wherein there are two hook-shaped form fitting elements (9) located on at least one, preferably both, of the ends of the load securing bar, which open toward one another, and which are spaced apart in a first open position, at least at their free ends, for receiving a tie bar (24), and are disposed such that they hook onto the tie bar in a form fitting manner when they are in a second, preferably lockable, closed position.

17 Claims, 5 Drawing Sheets

(56) References Cited

FOREIGN PATENT DOCUMENTS

WO     WO 2016 066549 A1     5/2016

OTHER PUBLICATIONS

Brochure entitled "my Sortimo®", ProSafe accessories, htttps://www.mysortimo.com/en/Load-Securing/Accessories-Load-Securing/ProSave-accessories/c/26421?q=:tsa, 2 pp., believed to have been sold before Sep. 8, 2017.

Extended EP Search Report for 18190544.9, dated Jan. 31, 2019, 7 pp.

* cited by examiner

LOAD SECURING BAR

CROSS-REFERENCE TO RELATED APPLICATIONS

This application claims priority from German Utility Model Application No. 20 2017 105 457.8, filed on Sep. 8, 2017, the entirety of which is fully incorporated by reference herein.

The invention relates to a load securing bar for a load securing system with lashing points that have at least one tie bar, which has hook-shaped form fitting elements on the ends of the load securing bar.

There are currently numerous forms of load securing systems for vehicles in the prior art. Loads are secured with lashing belts, nets, load securing bars etc., wherein different systems have become established in the market which are substantially distinguished by the design of the lashing points, i.e. the points at which the load securing elements are attached to the vehicle.

A known load securing system is the so-called "airline system," which has lashing rails in the vehicle that form numerous lashing points over the length of the rail. A load securing bar described in EP 2 907 696 A1 belongs to the prior art, which is intended for use with airline systems, and which can be easily and securely attached to such airline rails in a vehicle.

These load securing bars are not suitable for other securing systems, e.g. with round-hole lashing rails or keyhole lashing rails, due to the incompatibility with the lashing points or lashing fittings.

One common load securing system exists in which the lashing points are formed by a tie bar, with the individual lashing points formed by a fitting with an oblong hole interrupted by a transverse tie bar, or in which rails are used that have a deep longitudinal groove interrupted by tie bars. These tie bars are used for securing load securing fittings, typically in the form of hooks, which hook onto a tie bar at one end in the installed state, and are secured laterally in the hole or groove at the other end.

The object of the present invention is to create a load securing bar for a load securing system with lashing points of the type described above, thus containing at least one tie bar, which can accommodate large forces and can also be safely and easily attached, and will not release on their own.

This object is achieved in accordance with the invention by a load securing bar that has the features given in claim 1. Advantageous designs of the invention can be derived from the dependent claims, the following description, and the drawings.

The load securing bar according to the invention is intended for a load securing system that has lashing points which have at least one tie bar. By way of example, these are lashing points formed by a fitting that has an oblong hole interrupted by a tie bar, wherein the tie bar is spaced apart from the mounting surface such that a hook-shaped fitting can hook onto it. The load securing bar according to the invention is used thereby in conjunction with vertical rails, for example, inside the vehicle, that have a comparatively deep groove, which is interrupted by transverse tie bars disposed at spacings over the length thereof. These rails and fittings are sold, for example, by the company Sortimo under the name "Pro Safe."

The load securing bar according to the invention has hook-shaped form fitting elements on the ends, and is characterized in that two hook-shaped form fitting elements are formed on at least one end of the load securing bar, but preferably on each end thereof, which open toward one another, which are spaced apart at least at their free ends when in the open position in order to receive a tie bar at the lashing point, and which hold the tie bar in a form fitting manner when they are closed. In the closed position, the form fitting elements can preferably be locked in place in order to securely prevent an unintended release.

The fundamental idea of the present invention is to preferably secure the load securing bars in all directions at both ends in a lashing point in a form fitting manner, in order to ensure that it will not release therefrom unintentionally, and to be able to safely accommodate greater loads. The structure of the end fittings is such that two hook-shaped form fitting elements are arranged facing one another, such that one hook can hook onto the tie bar from one side, while the other one hooks onto the tie bar from the other side, thus securing the load securing bar in all directions in a form fitting manner, independently of the where it is attached. This means that there is an open position, in which the hooks are spaced apart at least at their free ends, such that the fitting is open, in order to receive a tie bar, and a closed position, in which the two hook-shaped form fitting elements encompass, entirely or nearly entirely, the tie bar, such that the load securing bar is secured to the tie bar in a form fitting manner. These end fittings are preferably provided on both ends of the load securing bar, but it is also conceivable to have such an end fitting, with two hook-shaped form fitting elements that fully encompass the tie bar, on just one end, and a simple hook or other appropriate fitting at the other end. A "hook-shape" as set forth in the present invention can also be a simplified hook shape, e.g. an L-shape, since the important thing is that a free space for receiving the tie bar is formed by two hook-shaped form fitting elements when they are in the closed position, which is closed such that the load securing bar cannot be released unintentionally, or because of loads applied to it.

It is particularly advantageous when the load securing bar has a telescoping design according to a further development of the invention, such that its length can be adjusted to the distance between two lashing points. For this, it is made of tubes that fit into one another, which can move to a limited extent in relation to one another, such that the load securing bar cannot be pulled apart, but can only be lengthened or shortened to a predefined extent. This latter design is also useful for securing both ends by means of two hook-shaped form fitting elements. For this, the load securing bar advantageously comprises two tubes that are connected to one another by a telescoping tube, i.e. two tubes that either encompass a telescoping tube at each end, or which are inserted into such a telescoping tube. One of the tubes is preferably connected to the telescoping tube in a fixed manner, while the other tube can slide axially along this tube to a limited extent. Fundamentally, it is also possible for both tubes to be able to slide axially on the telescoping tube to a limited extent. A fixed connection of such tubes can be easily achieved by a cross-pin or rivet passing through both tubes, and an axially limited adjustable connection can be obtained by a cross-pin permanently attached to one tube and inserted in a longitudinal groove in the other tube. The ends of the longitudinal groove then limit the extent to which the assembly can be extended.

In order to ensure that the load securing bar can be safely and easily attached to a lashing point, there is a control element for controlling the position of the form fitting elements according to the invention, which is disposed such that it can be displaced longitudinally in the load securing bar, and which can be activated by a tie bar at a lashing point to which the end of the load securing bar is to be secured. With an appropriate design of such a control element, which shall be explained in greater detail below, one end of a load securing bar can be secured to a tie bar at the lashing point in a nearly automatic manner, in that an end of the load securing bar is simply placed against the tie bar at a lashing point, such that when the load securing bar is pushed against the tie bar the control element moves in the direction of the load securing bar, moving the hook-shaped form fitting elements from the open position to the closed position, in which they encompass the tie bar, and thus encompass it in a form fitting manner.

Fundamentally, the mechanism causing the movement between the control element and the hook-shaped form fitting elements can be provided at the end of a tube forming the load securing bar, but it is particularly advantageous when it is provided on one end of a tube-shaped end piece, which is permanently attached to the adjoining tube of the load securing bar, wherein the hook-shaped form fitting elements are disposed on this tubular end piece, and the control element is partially accommodated therein and can move axially to a limited extent. This design is advantageous, particularly in terms of production, because such a tube-shaped end piece, which has the mechanism for the hook-shaped form fitting elements disposed thereon, as well as the control element, can be produced independently of the length of the load securing bar, such that load securing bars of different lengths can be provided with identical end pieces. With this design it is also relatively simple to create load securing bars of specific lengths, largely using existing components.

The mechanical coupling of the hook-shaped form fitting elements and the control element can be achieved in a variety of ways, e.g. through track guides between the components, but it is particularly advantageous when the hook-shaped form fitting elements are attached to the end piece at their load securing bar ends in a hinged manner, near the end of the end piece, this being such that the pivotal axes thereof are parallel to one another, and preferably disposed in a transverse plane that is perpendicular to the longitudinal axis of the load securing bar.

The control element can advantageously be coupled to the hook-shaped form fitting elements such that it can move when the control element is inserted into the load securing bar, thus moving the hook-shaped form fitting elements from the open position to the closed position, such that the tie bar at the lashing point is entirely, or nearly entirely, encompassed.

The control element, which can be pin-shaped or made of sheet metal, has a recess on both of its longitudinal surfaces, into which a projection provided on a hook-shaped form fitting element engages, which is disposed at a radial spacing to the pivotal axis. The projection is disposed not only at a radial spacing to the pivotal axis, but it is also substantially transverse to the longitudinal extension of the hook-shaped form fitting elements, such that it can convert the longitudinal movement of the control element into a pivotal movement of the form fitting element. It is particularly advantageous when the recesses on the two opposing longitudinal surfaces of the control element are at the same level, because this means that the hook-shaped form fitting elements can be identical for both sides with the appropriate structural design, i.e. only identically shaped stamped components typically need to be produced.

The control element is advantageously spring-loaded in the direction of extension, as can be obtained, for example, with a helical spring, braced at one end against the control element, and on a cross-pin at the other end, which connects the tubular end piece to the tube.

To ensure that the form fitting connection between the hook-shaped form fitting elements and the tie bar does not release unintentionally, a preferably automatic locking is provided according to an advantageous further development of the invention. Such a locking is formed by at least one locking or latching element, preferably in the form of a sphere, and at least one hole in the tubular end piece, or in the end of the tube, if such an end piece is not provided, corresponding to the size of the locking element. There is furthermore a lateral recess, preferably a groove, flush with the recess in the end piece, in the control element, such that when the control element is inserted axially into the load securing bar, its recess, or groove, is aligned with the hole in the end piece, such that the locking element is located in both the hole in the end piece as well as the recess in the control element, and the two pieces are coupled for movement in the axial direction, i.e. the control element is fixed in relation to the end piece. As a result, movement of the control element is blocked, thus preventing a movement of the hook-shaped form fitting elements from the closed position to the open position.

This locked position, described above, can be advantageously secured by a latching sleeve that can be displaced axially, which encompasses the end piece, or the end of the tube if no such end piece is provided, which is locked in place in its locking position in a form fitting manner at a spring-loaded end position. The latching sleeve is advantageously spring-loaded, such that it is automatically slid into the form fitting locking position, and can only be pulled back against this spring force, e.g. manually, far enough that a space is formed for part of the locking element, which can then exit the lateral recess in the control element, such that the control element is no longer secured in a form fitting manner. In practice, axial displacement by hand, counter to the spring force, is sufficient for releasing the load securing bar, because as soon as the locking element is no longer engaged in the recess in the control element, it is pushed out of the load securing bar by the spring force, or the load securing bar is pushed back in relation to the control element, which pushes against the tie bar at the lashing point, thus opening the hook-shaped form fitting elements and releasing the tie bar. Advantageously, numerous locking elements are provided, distributed over the circumference, provided in corresponding holes in the end piece, or the end of the tube, which engage in either a circumferential groove on the control element, or exit into a circumferential groove in the latching sleeve, when the control element is released.

The invention is explained in greater detail below based on an exemplary embodiment illustrated in the drawings. Therein.

The load securing bar illustrated in the drawings is a telescoping load securing bar, i.e. it can be modified in terms of length, with end fittings 1, which are configured for a load securing system with lashing points that have at least one tie bar. The load securing bar has two tubes 2 and 3 of the same diameter, which are connected to one another via a telescoping tube 4, which is connected in a fixed manner to the tube 3, and connected to tube 4 such that it can move axially to a limited extent, in order to be able to modify the length of the load securing bar within limits by axially displacing the tubes 2 and 3 in relation to one another.

Tubes 2 and 3 are each connected in a fixed manner to a tubular end piece 5 at their free ends, which contains the actual end fitting 1. The tubular end pieces 5, with the components disposed thereon, are identical at both ends of the load securing bars in the depicted embodiment, for which reason the structure thereof is described below in detail, on the basis of one end of the load securing bar, as depicted in FIGS. 8-13.

A tubular end piece 5 is inserted into the free ends of the tubes 2 and 3, and connected thereto by means of a cross-pin 6, which passes through both of the tubes 2 and 5, and 3 and 5, respectively. This cross-pin, connecting the components, is not shown in FIGS. 10 and 13.

An annular element 7 is formed, extending to the free end of the tubular end piece 5, which extends radially inward and outward over the remaining cross section of the tubular end piece 5. A mount is formed on the end surface of this annular element 7 by two tabs 8 spaced apart from one another, for a hook-shaped form fitting element 9 that can pivot over an axle 10 between the tabs 8. The hook-shaped form fitting element 9 is a stamped part, and is basically shaped like an "L" when seen from above (FIG. 10/FIG. 13), which is attached to the axle 10 at the end of the longer leg, and has a projection at a distance to the axle 10. The form fitting elements 9 are positioned such that their shorter legs abut one another at the ends in the closed position shown in FIG. 13, and their longer legs are parallel to one another, and run along the longitudinal direction of the load securing bar. The axles 10, which also form the rotational axes for the hook-shaped form fitting elements 9, are parallel and at a spacing to one another, such that the rotational axes are in a plane transverse to the longitudinal axis of the load securing bar.

A control element 12 is supported in a sliding manner within the tubular end piece 5, which has an inner, circular cross section, which adjoins a protruding flat element at its end that passes through the annular element 7, and which has an indent 13 at its free end as well as recesses 14 on its longitudinal surfaces, provided for receiving the projections 11 of the hook-shaped form fitting elements 9. The control element 12 also has a circumferential groove 15 in the region of its cylindrical element, and is designed and disposed such that it can be displaced axially within the annular element 7, but cannot be rotated, such that the front flat part of the control element 12 with the front indent 13 always has the same orientation to the form fitting elements 9. The control element 12 is spring loaded toward the direction of extension by a helical spring 16, which bears on the inner end surface of the control element 12 at one end, and the cross-pin 6 at the other end.

A sleeve 17 is disposed on the outer circumference of the tubular end piece 5, which forms a latching sleeve with its part facing the annular element 7, and forms a guide on the tube 2 or 3 with its inward-facing part. A helical spring 18 is located between the end surface of the tube 2 and a ledge inside the sleeve 17, which applies a force to the sleeve 17 toward the annular element 7, and pushes it against the annular element 7, if there are no obstructions. The sleeve 17 has a circumferential groove 19 on the inside, which can be brought to the level of the circular holes 20 in the tubular end piece 5 when it is slid longitudinally onto the tubular end piece 5, such that locking elements in the form of spheres 21, which are each disposed in the holes 20, can be brought into a locking position in the free space formed by the groove 17 and the holes 20, or, when the sleeve 17 has been slid to the annular element 7 and the spheres 21 are located in the holes 20 and the groove 15, lock the control element 12 against the end piece for conjoint rotation therewith. The sleeve 17, which has been slid over the holes 20 then retains the spheres 21 in this position until the sleeve 17 has been pulled back manually, counter to the force of the helical spring 18.

Figure 11:
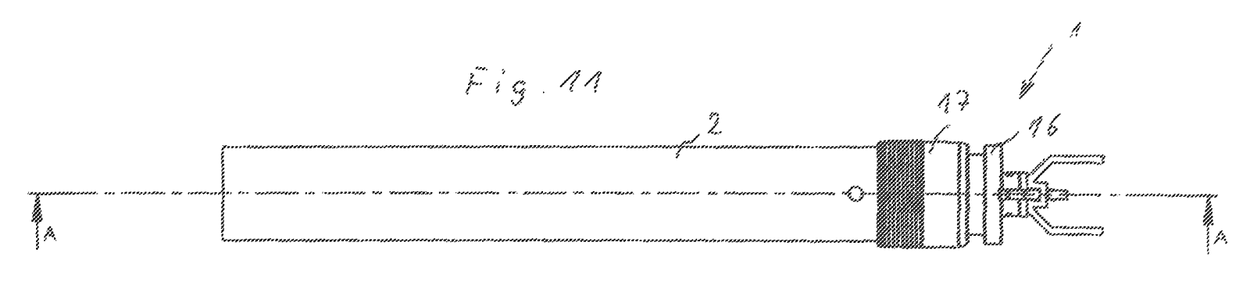
FIG. 11 shows the load securing bar according to FIG. 8, with closed, but not yet locked, end fittings.
Figure 12:
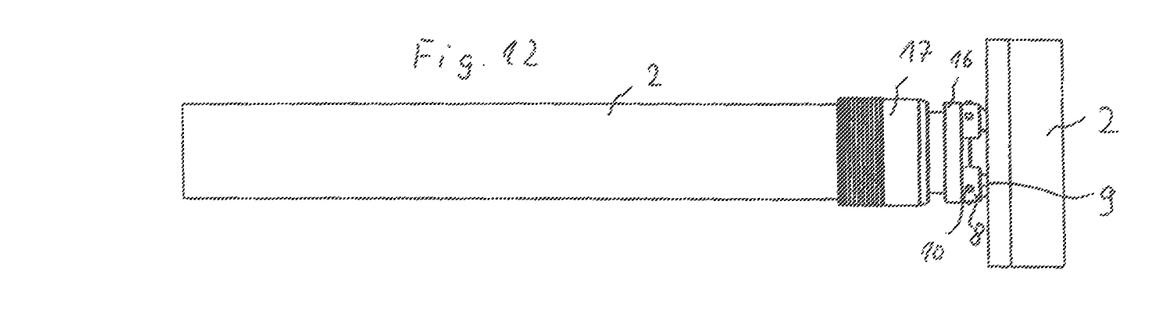
FIG. 12 shows the load securing bar, rotated 90° with respect to that in FIG. 11.
Figure 13:
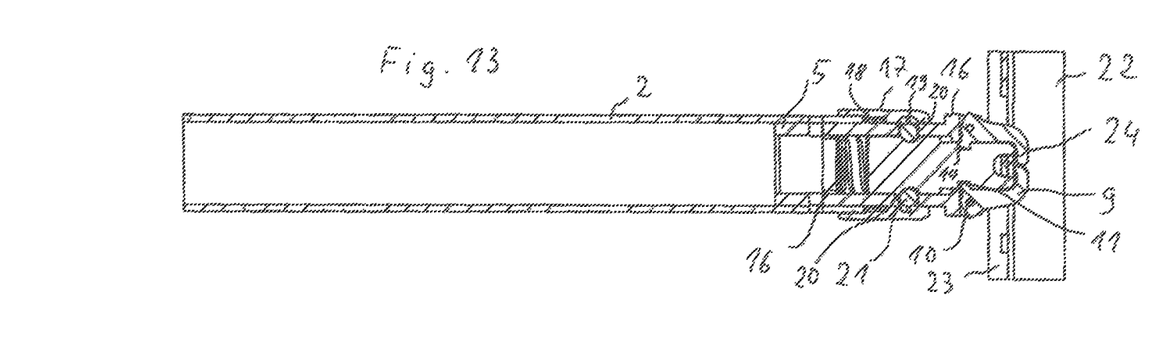
FIG. 13 shows a cutaway view, cut along the line A-A in FIG. 11.

FIGS. 8-13 show not only the load securing bar, but also the associated lashing point in the form of a lashing fitting. The lashing fitting illustrated therein is a rail 22 with a groove 23 running over its entire length, which is interrupted at spacings by tie bars 24. The groove 23 is deep enough, as indicated in FIGS. 11-13, that the hook-shaped form fitting elements can hook onto a tie bar 24, as is shown in FIG. 13.

Figure 1:
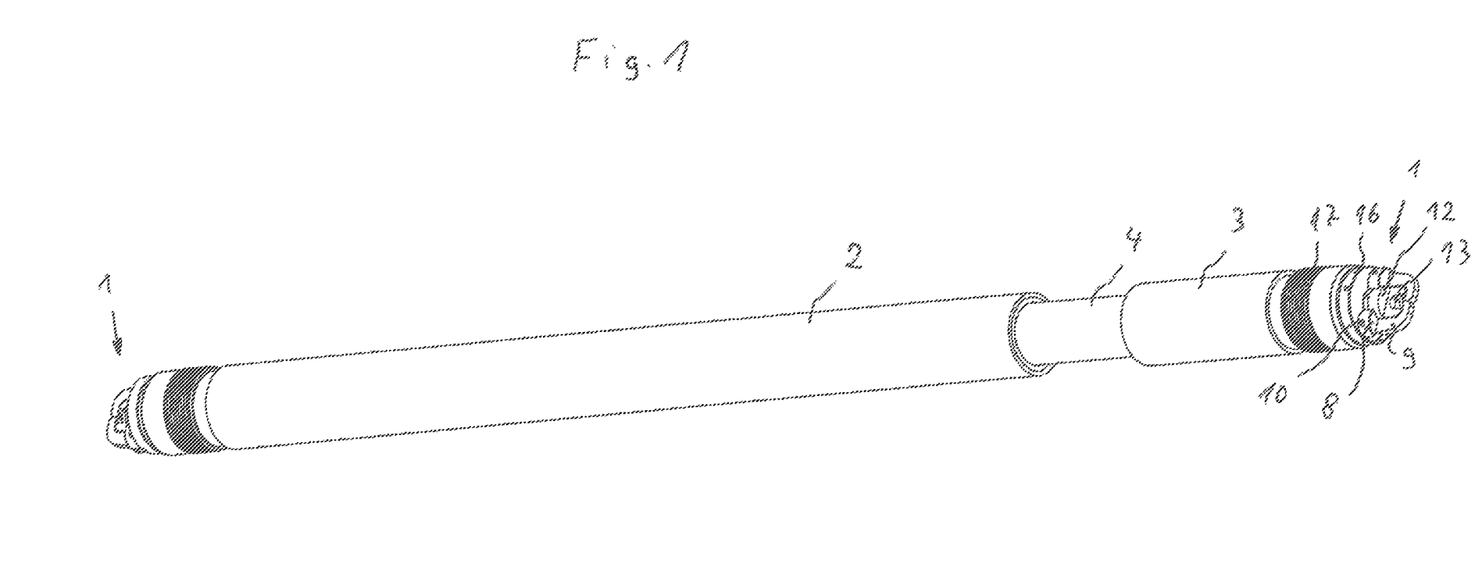
FIG. 1 shows, in a highly simplified schematic perspective illustration, a load securing bar according to the invention.
Figure 2:
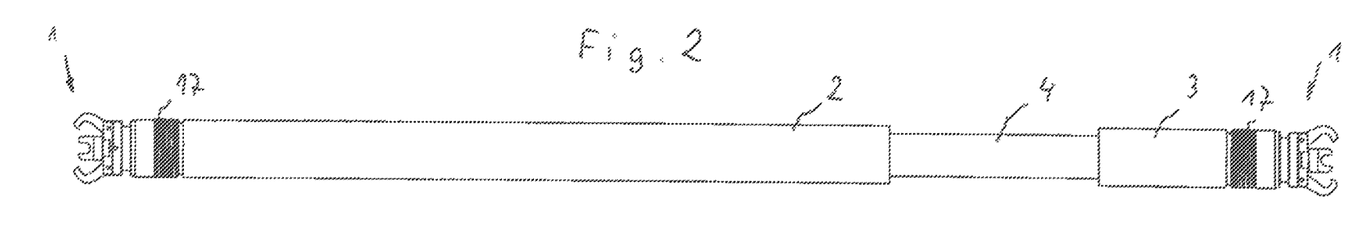
FIG. 2 shows a side view of the load securing bar according to FIG. 1 with open end fittings.
Figure 3:
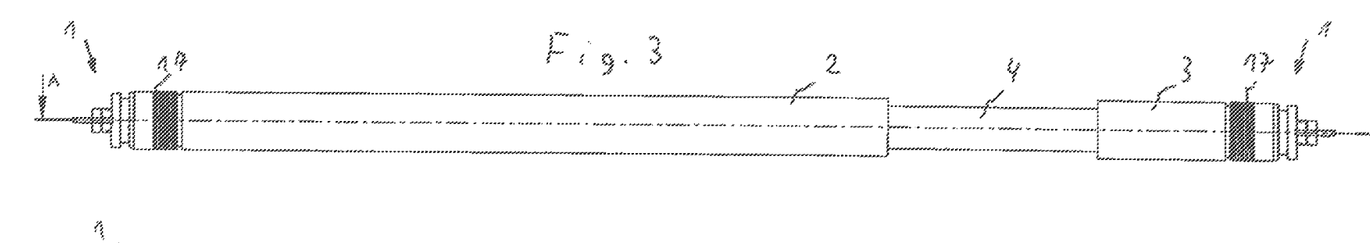
FIG. 3 shows a side view of the load securing bar, rotated 90° with respect to that in FIG. 2.
Figure 4:
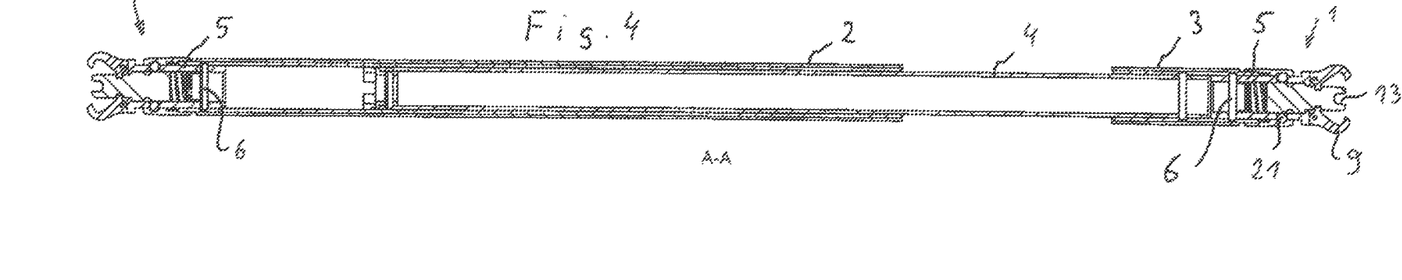
FIG. 4 shows a cutaway view, cut along the line A-A in FIG. 3
Figure 5:
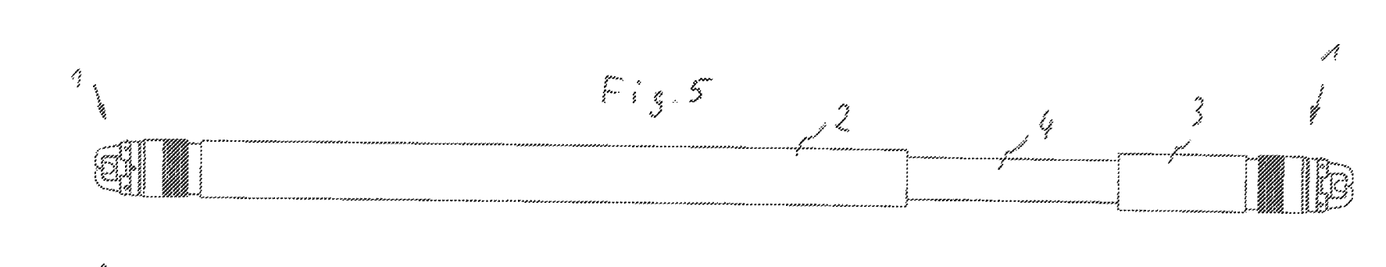
FIG. 5 shows the load securing bar according to FIG. 2, with closed end fittings.
Figure 6:
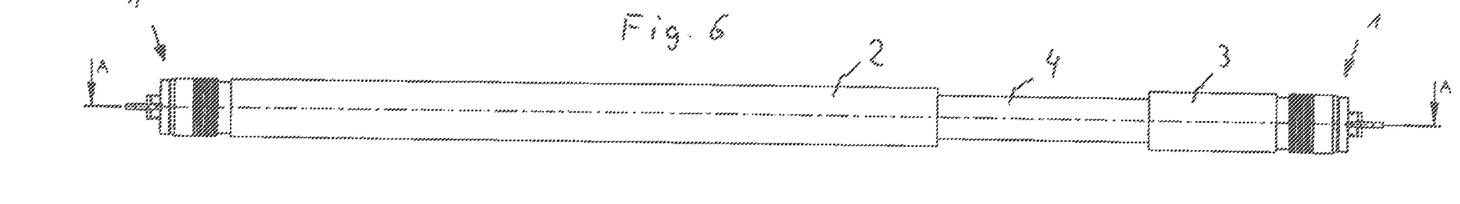
FIG. 6 shows the load securing bar according to FIG. 5, corresponding to that in FIG. 3.
Figure 7:
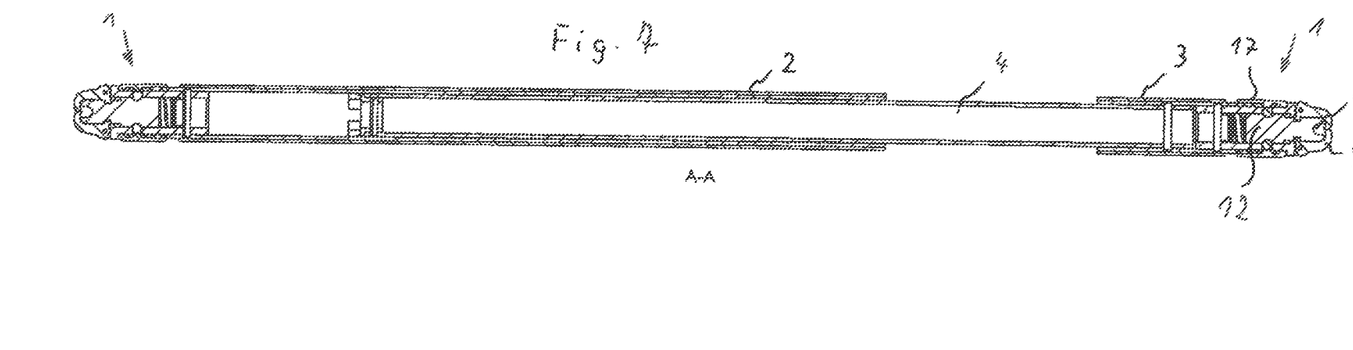
FIG. 7 shows a cutaway view, cut along line A-A in FIG. 6.
Figure 8:
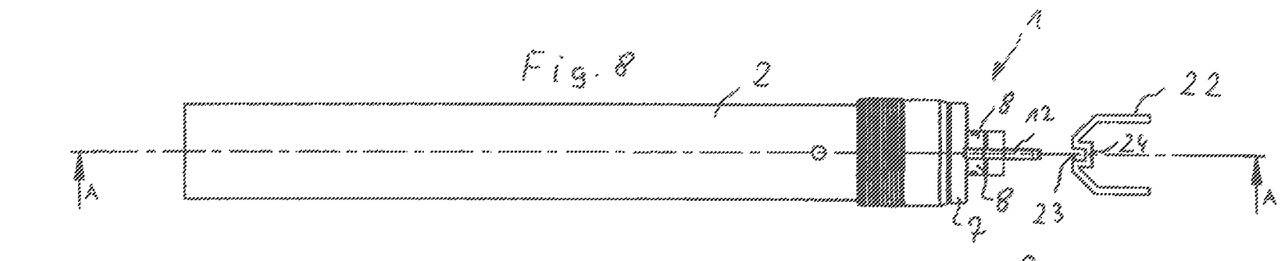
FIG. 8 shows an enlargement of an end of the load securing bar corresponding to FIG. 6, with the associated lashing rail.
Figure 9:
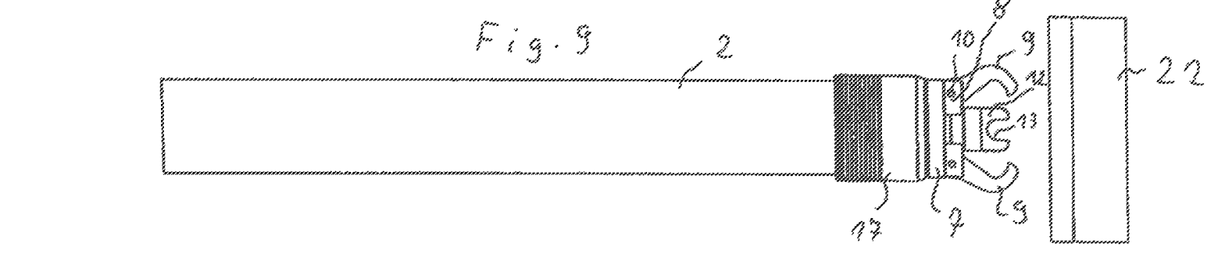
FIG. 9 shows the load securing bar, rotated 90° with respect to that in FIG. 8.
Figure 10:
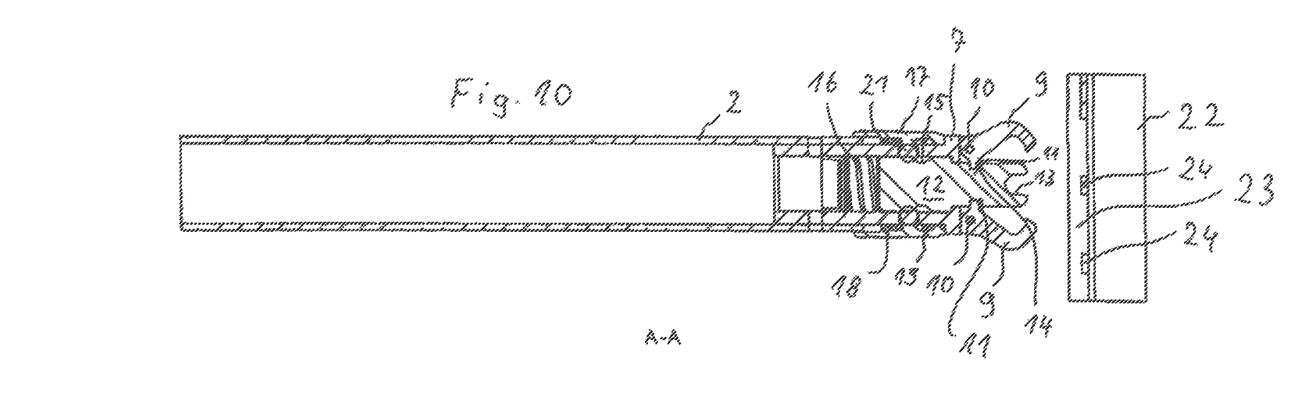
FIG. 10 shows a cutaway view, cut along the line A-A in FIG. 8.

To secure an end fitting 1 of the load securing bar in the lashing point, thus on the tie bar 24 of the rail 22, the load securing bar with the end fitting is brought into the initial position, as shown in FIGS. 2-4, with the hook-shaped form fitting elements 9 in their open position, and the control element 12 extended toward the free end, in which the end surface indentation 13 of the control element 12 bears on a tie bar 24 of a lashing point. The form fitting elements 9 are spread apart, as shown in FIGS. 2 and 4, and the control element 12 is pushed out of the load securing bar by the spring 16 and pivots the form fitting elements 9 outward via the projections 11 disposed in the holes 14. The sleeve 17 is secured to the end piece 5 by the spheres 21 located in the groove 19, which are partly located in the holes 20 and partly in the groove 19. As soon as the tie bar 24 reaches the front indentation 13 on the control element 12, the load securing bar is pushed toward the tie bar 24 counter to the spring force of the helical spring 16, resulting in the control element 12 being pushed into the interior of the tubular end piece 5, because the tie bar 24 is stationary, thus driving the hook-shaped form fitting elements 9 into the closed position via the projections 11 located in the holes 14, in which the ends of the short legs of the form fitting elements 9 bear against one another, securing the tie bar 24 in a form fitting manner in the end fitting 1 through the front indentation 13 of the control element in conjunction with the hook-shaped form fitting elements 9 in the end fitting, encompassing it from both sides. The groove 15 overlaps the holes 20 when the control element is inserted into the tubular end piece 5, and the spheres 21 in the holes 20 move radially inward, due to the spring force of the helical spring 18, such that the spheres 21 are then located in both the groove 15 and the holes 20, and the locking part of the sleeve 17 is slid over the holes 20 by the spring force, and the sleeve 17 bears on the annular element 7. In this position, the connection of the end fitting 1 to the tie bar 24 of the lashing point is secured in a form fitting manner, and can only be released manually.

In order to release it, the sleeve 17 must be manually slid back until the groove 19 overlaps the holes 20, such that the spheres 21 can move radially outward, and the control element 12 can be moved axially outward. This movement takes place as a result of the spring force of the helical spring 16, and spreads out the form fitting elements 9 to their open position, at which point the initial position described above is again obtained.

The specification can be exemplified with the representative paragraphs.

Representative paragraph 1: A load securing bar for a load securing system with lashing points that have at least one tie bar (24), which has hook-shaped form fitting elements (9) on the ends of the load securing bar, characterized in that there are two hook-shaped form fitting elements (9) located on at least one, preferably both, of the ends of the load securing bar, which open toward one another, and which are spaced apart in a first open position, at least at their free ends, for receiving a tie bar (24), and are disposed such that they hook onto the tie bar in a form fitting manner when they are in a second, closed position.

Representative paragraph 2: The load securing bar according to representative paragraph 1, characterized in that the second, closed position can be locked.

Representative paragraph 3: The load securing bar according to representative paragraphs 1 or 2, characterized in that the load securing bar has telescoping tubes (2, 4) for modifying the length thereof, preferably to a limited extent.

Representative paragraph 4: The load securing bar according to any of the preceding representative paragraphs, characterized in that the load securing bar has two tubes (2, 3), which are connected to one another by a telescoping tube (4), and in that the telescoping tube (4) is preferably connected in a fixed manner to the one tube (3), and connected to the other tube (2) such that it can move axially in relation thereto, to a limited extent.

Representative paragraph 5: The load securing bar according to any of the preceding representative paragraphs, characterized in that a control element (12) is provided for controlling the position of the form fitting elements (9), which can be displaced axially along the load securing bar, and can be activated by a tie bar (24) of a lashing point.

Representative paragraph 6: The load securing bar according to any of the preceding representative paragraphs ms, characterized in that a tubular end piece 5 is provided on at least one end, which is connected in a fixed manner to the adjoining tube (2, 3) of the load securing bar, with the hook-shaped form fitting elements (9) disposed on said end piece (5), and in which the control element (12) is at least partially accommodated, and can move axially to a limited extent.

Representative paragraph 7: The load securing bar according to any of the preceding representative paragraphs, characterized in that the hook-shaped form fitting elements (9) are connected in a hinged manner to the end piece (5), near the free end thereof, such that their pivotal axes are parallel to one another and disposed in a transverse plane that is perpendicular to the longitudinal axis of the load securing bar.

Representative paragraph 8: The load securing bar according to any of the preceding representative paragraphs, characterized in that the control element (12) is coupled to the hook-shaped form fitting elements (9) in a manner allowing for movement, such that when the control element (12) is inserted into the load securing bar, the hook-shaped form fitting elements (9) are moved from their open position to the closed position.

Representative paragraph 9: The load securing bar according to any of the preceding representative paragraphs, characterized in that the control element (12) has recesses (14) on its longitudinal surfaces, in which projections engage (11) that are disposed on the hook-shaped form fitting elements (9) at a radial spacing to their pivotal axes.

Representative paragraph 10: The load securing bar according to any of the preceding representative paragraphs, characterized in that the control element (12) is spring-loaded in the direction of extension.

Representative paragraph 11: The load securing bar according to any of the preceding representative paragraphs, characterized in that at least one locking element (21), preferably in the form of a sphere (21), is disposed in at least one hole (20) in an end piece, which blocks the axial movement between the control element (12) and the end piece (5) when the locking element (21) is disposed in the hole (20) in the end piece (5) and in a lateral recess of the control element (12), preferably a groove (15).

Representative paragraph 12: The load securing bar according to any of the preceding representative paragraphs, characterized in that a latching sleeve (17) encompassing the end piece (5) is provided that can be displaced axially, which locks the locking element (21) in its locking position in a form fitting manner when it is in the spring-loaded end position, and which forms a free space (19) for a part of the locking element (21) when it is in an unlocking position, formed counter to the spring force.

REFERENCE SYMBOLS 1 end fitting
2 long tube
3 short tube
4 telescoping tube
5 tubular end piece
6 cross-pin
7 annular element
8 tab
9 hook-shaped form fitting element
10 axle
11 projection on 9
12 control element
13 end surface indentation on control element
14 lateral recesses on control element
15 circumferential groove on control element
16 helical spring
17 sleeve
18 helical spring
19 groove in the sleeve
20 holes in tubular end piece 5
21 spheres
22 rail
23 groove
24 tie bars

The invention claimed is:

1. A load securing bar for a load securing system with lashing points that have at least one tie bar, the load securing bar comprising:
a pair of hook-shaped form fitting elements located on an end of a first tube, the pair of hook-shaped form fitting elements including a first hook-shaped form fitting element and a second hook-shaped form fitting element, wherein a hook of the first hook-shaped form fitting element is open toward the second hook-shaped form fitting element, and wherein a hook of the second hook-shaped form fitting element is open toward the first hook-shaped form fitting element, wherein a free end of the first hook-shaped form fitting element is spaced apart from a free end of the second hook-shaped form fitting element in a first open position, wherein the first hook-shaped form fitting element and the second hook-shaped form fitting element are disposed such that they hook onto the tie bar in a form fitting manner when they are in a second, closed position, and wherein a control element is included for controlling the position of the pair of hook-shaped form fitting elements, wherein the control element is displaceable axially along the first tube, and wherein the control element is configured to be activated by a tie bar of a lashing point.

2. The load securing bar according to claim 1, wherein the second, closed position is a lockable position.

3. The load securing bar according to claim 1, wherein the load securing bar has at least one telescoping tube coupled to the first tube for modifying a length of the load securing bar.

4. The load securing bar according to claim 1, wherein the load securing bar has the first tube and a second tube, wherein the first tube and the second tube are connected to one another by a telescoping tube, wherein the telescoping tube is coupled in a fixed manner to the first tube, and wherein the telescoping tube is coupled in a movable manner to the second tube such that the telescoping tube is moveable axially in relation to the second tube.

5. The load securing bar according to claim 1, wherein a tubular end piece is included on an end of the first tube, wherein the tubular end piece is connected in a fixed manner to the first tube, wherein the pair of hook-shaped form fitting elements is disposed on the tubular end piece, and wherein the control element is at least partially accommodated by the tubular end piece and is movable axially relative to the tubular end piece.

6. The load securing bar according to claim 5, wherein the first and second hook-shaped form fitting elements are connected in a hinged manner to the tubular end piece.

7. The load securing bar according to claim 1, wherein the control element is coupled to the first and second hook-shaped form fitting elements such that movement of the control element relative to the first tube causes movement of the first and second hook-shaped form fitting elements.

8. The load securing bar according to claim 1, wherein the control element is spring-loaded in a direction of extension of the load securing bar.

9. The load securing bar according to claim 1, wherein at least one locking element is disposed in at least one hole in an end piece, and wherein the at least one locking element blocks an axial movement between the control element and the end piece when the locking element is disposed in the hole in the end piece and in a lateral recess of the control element.

10. A load securing bar for a load securing system with lashing points that have at least one tie bar, the load securing bar comprising:

a pair of hook-shaped form fitting elements located on an end of a first tube, the pair of hook-shaped form fitting elements including a first hook-shaped form fitting element and a second hook-shaped form fitting element, wherein a hook of the first hook-shaped form fitting element is open toward the second hook-shaped form fitting element, and wherein a hook of the second hook-shaped form fitting element is open toward the first hook-shaped form fitting element, wherein a free end of the first hook-shaped form fitting element is spaced apart from a free end of the second hook-shaped form fitting element in a first open position, and wherein the first hook-shaped form fitting element and the second hook-shaped form fitting element are disposed such that they hook onto the tie bar in a form fitting manner when they are in a second, closed position, wherein a control element is included for controlling the position of the pair of hook-shaped form fitting elements, wherein the control element is displaceable axially along the first tube, and wherein the control element is configured to be activated by a tie bar of a lashing point, and wherein the control element comprises at least one recess on a longitudinal surface, and wherein at least one projection of the pair of hook-shaped form fitting elements is configured to engage the at least one recess.

11. The load securing bar according to claim 10, wherein the second, closed position is a lockable position.

12. The load securing bar according to claim 10, wherein the load securing bar has at least one telescoping tube coupled to the first tube for modifying a length of the load securing bar.

13. The load securing bar according to claim 10, wherein the load securing bar has the first tube and a second tube, wherein the first tube and the second tube are connected to one another by a telescoping tube, wherein the telescoping tube is coupled in a fixed manner to the first tube, and wherein the telescoping tube is coupled in a movable manner to the second tube such that it can move axially relative to the second tube.

14. The load securing bar according to claim 13, wherein a tubular end piece is included on an end of the first tube, wherein the tubular end piece is connected in a fixed manner to the first tube, wherein the pair of hook-shaped form fitting elements are disposed on the tubular end piece, and wherein the control element is at least partially accommodated by the tubular end piece and is movable axially relative to the tubular end piece.

15. The load securing bar according to claim 14, wherein the first and second hook-shaped form fitting elements are connected in a hinged manner to the tubular end piece.

16. The load securing bar according to claim 10, wherein the control element is spring-loaded in a direction of extension of the load securing bar.

17. The load securing bar according to claim 10, wherein at least one locking element is disposed in at least one hole in an end piece, and wherein the at least one locking element blocks an axial movement between the control element and the end piece when the locking element is disposed in the hole in the end piece and in a lateral recess of the control element.

* * * * *